(12) United States Patent
Sugaya

(10) Patent No.: US 9,880,634 B2
(45) Date of Patent: Jan. 30, 2018

(54) GESTURE INPUT APPARATUS, GESTURE INPUT METHOD, AND PROGRAM FOR WEARABLE TERMINAL

(71) Applicant: OPTiM Corporation, Saga (JP)

(72) Inventor: Shunji Sugaya, Tokyo (JP)

(73) Assignee: OPTIM CORPORATION, Saga-Shi (JP)

( * ) Notice: Subject to any disclaimer, the term of this patent is extended or adjusted under 35 U.S.C. 154(b) by 97 days.

(21) Appl. No.: 15/072,457

(22) Filed: Mar. 17, 2016

(65) Prior Publication Data

US 2016/0274670 A1    Sep. 22, 2016

Related U.S. Application Data

(60) Provisional application No. 62/135,771, filed on Mar. 20, 2015.

(51) Int. Cl.
| | | |
|---|---|---|
| G06K 9/00 | (2006.01) | |
| G06F 3/01 | (2006.01) | |
| G06K 9/46 | (2006.01) | |
| G06K 9/62 | (2006.01) | |
| H04N 7/14 | (2006.01) | |

(52) U.S. Cl.
CPC ......... G06F 3/017 (2013.01); G06K 9/00033 (2013.01); G06K 9/00355 (2013.01); G06K 9/00369 (2013.01); G06K 9/4671 (2013.01); G06K 9/6215 (2013.01); H04N 7/141 (2013.01)

(58) Field of Classification Search
None
See application file for complete search history.

(56) References Cited

U.S. PATENT DOCUMENTS

| | | |
|---|---|---|
| 2014/0354683 A1 | 12/2014 | Suzuki et al. |
| 2014/0368426 A1 | 12/2014 | Umehara et al. |
| 2015/0074615 A1* | 3/2015 | Han .................. G06K 9/00033 |
| | | 715/863 |
| 2015/0141076 A1 | 5/2015 | Libin et al. |
| 2016/0291691 A1 | 10/2016 | Lee |
| 2016/0353064 A1 | 12/2016 | Aiura |

FOREIGN PATENT DOCUMENTS

JP    2007-080214    3/2007

* cited by examiner

*Primary Examiner* — Atiba O Fitzpatrick
(74) *Attorney, Agent, or Firm* — Lex IP Meister, PLLC

(57) ABSTRACT

A trajectory of a user's finger is converted to an input signal without touching a sensor. A gesture input apparatus 1 acquires images photographed by a camera 101 and a camera 102 when a user's finger draws a trajectory like arrows 202 and 203 by stroking, for example, reference numbers 201*b* and 201*c* from a reference number 201*a*, detects a user's fingerprint in the images, and stores the trajectory in a fingerprint position database 50. Thereafter, the gesture input apparatus 1 extracts from a motion pattern database 51 a motion pattern matching with the trajectory of the user's finger and extracts an input signal associated with the motion pattern. Then, the gesture input apparatus 1 converts the trajectory of the user's finger to the input signal such that the extracted input signal behaves in the same manner as being actually input.

6 Claims, 10 Drawing Sheets

<FINGERPRINT DETECTING AND POSITION STORING PROCESS>

FIG. 9

<FINGERPRING POSITION TABLE>

| DATA | TIME | X-AXIS | Y-AXIS | Z-AXIS | ROLL | PITCH | YAW |
|---|---|---|---|---|---|---|---|
| 2012/6/19 | 12H:54M:43S | 18 | -12 | 51 | -122 | 19 | 31 |
| 2012/6/19 | 12H:54M:44S | 23 | -14 | 52 | -119 | 26 | 32 |
| 2012/6/19 | 12H:54M:45S | 91 | -15 | 54 | -115 | 33 | 32 |
| 2012/6/19 | 12H:54M:46S | 93 | 66 | 53 | -126 | 24 | 32 |

FIG. 10

<MOTION PATTERN TABLE>

| PATTERN ID | STEP 1 | STEP 2 | STEP 3 | STEP 4 | INPUT SIGNAL ID |
|---|---|---|---|---|---|
| 1 | RIGHT | NULL | NULL | NULL | 55 |
| 2 | RIGHT | UP | NULL | NULL | 33 |
| 3 | RIGHT | LEFT | NULL | NULL | 12 |
| ... | ... | ... | ... | ... | ... |
| 11 | RIGHT.UP | LEFT | NULL | NULL | 16,42 |
| ... | ... | ... | ... | ... | ... |
| 51 | FORWAED | BACKWARD.LEFT | DOWN | NULL | 61 |
| ... | ... | ... | ... | ... | ... |

GESTURE INPUT APPARATUS, GESTURE INPUT METHOD, AND PROGRAM FOR WEARABLE TERMINAL

CROSS-REFERENCE TO RELATED APPLICATION

The present application claims priority to and the benefit of U.S. Provisional Application No. 62/135,771, filed on Mar. 20, 2015 in the U.S. Patent and Trademark Office, the entire contents of which are incorporated herein by reference.

BACKGROUND (a) Field

The present invention generally relates to a gesture input apparatus, a gesture input method, and a program for converting a trajectory on which a user moves a finger to an input signal.

(b) Description of the Related Art

Regarding operating means of pointing devices in electronic devices, a variety of input devices have been developed. As terminals are miniaturized, the operating means have been turned into mice required a certain degree of flat space, and analog sticks and jog dials which can also be used on the move have been mounted. Today, as the operating means in smartphones and slate terminals, touch panels are common.

However, when using the touch panel, because it is necessary to touch directly a liquid crystal panel with a finger, there is a problem that the liquid crystal panel becomes dirty or damaged. In addition, since the input is limited to a point on the touch panel, there is a restriction that only planar inputs can be detected as long as the touch panel is not a special form.

On the other hand, as a technique that has been recently noted, there is a scheme for determining a distance with the user by an infrared sensor or the like and converting the distance to an input signal. In this approach, a slope of a three-dimensional arm or a pointing direction can be detected, and also a specific event can be generated as an input to a device by a dynamic gesture such as shaking a hand or making a bow as well as a static state.

For example, a position detecting device for calculating a distance between a finger and each of three quantum infrared sensors A, B, and C from output signal strengths of the three quantum infrared sensors A, B, and C disposed in a form of a right angled isosceles triangle and calculating three-dimensional coordinates indicating a position of the finger from each distance is disclosed in Japanese Patent Application Publication No. 2007-80214.

However, in the position detecting device disclosed in Patent Document 1, it is natural that the terminal needs to attach a plurality of infrared sensors. Further, since the accuracy is degraded if the distance between the respective sensors is too close, it is necessary to secure a certain physical size, depending on the accuracy of the sensor.

SUMMARY

In order to solve the drawback of the above detection techniques, an embodiment of the present invention is to provide a gesture input apparatus, a gesture input method, and a program for, when a fingerprint of a user is detected from a photographed image and its trajectory matches with a predetermined motion pattern, converting the motion pattern to an input signal corresponding to the motion pattern.

According to an embodiment of the present invention, a gesture input apparatus for detecting a motion of a user's finger and converting the motion to an input signal is provided. The gesture input apparatus includes a photographing module configured to acquire as an image a predetermined range that is photographed; a fingerprint detecting module configured to analyze the image acquired by the photographing module and to detect a fingerprint of the user; a fingerprint motion storing module configured to store a trajectory of motions of the finger when the fingerprint detected by the fingerprint detecting module temporally changes according to an operation of the user's finger; and an input signal converting module configured to extract a predetermined motion pattern, which is set in advance, from the trajectory stored by the fingerprint motion storage unit and to convert the motion pattern to an input signal that is associated with the motion pattern in advance.

According to the above embodiment, a gesture input apparatus for detecting a motion of a user's finger and converting the motion to an input signal can acquire as an image a predetermined range that is photographed; analyze the acquired image to detect a fingerprint of the user, store a trajectory of motions of the finger when the detected fingerprint temporally changes according to an operation of the user's finger, extract a predetermined motion pattern, which is set in advance, from the stored trajectory, and convert the motion pattern to an input signal that is associated with the motion pattern in advance.

According to another embodiment of the present invention, the gesture input apparatus further includes a fingerprint identifying module configured to identify whether the fingerprint detected by the fingerprint detecting module matches with a fingerprint registered in advance.

According to the above embodiment, the gesture input apparatus can identify whether the fingerprint detected by the fingerprint detecting module matches with a fingerprint registered in advance.

According to yet another embodiment, the photographing module three-dimensionally photographs the predetermined range not two-dimensionally, and the fingerprint motion storing module three-dimensionally stores the motions of the finger.

According to the above embodiment, the gesture input apparatus can photograph the predetermined range not two-dimensionally, and three-dimensionally store the motions of the finger.

The above embodiments of the present invention relate to a gesture input apparatus but may be applicable to a gesture input method and a gesture input apparatus program in the same manner.

According to still another embodiment of the present invention, a gesture input method of detecting a motion of a user's finger and converting the motion to an input signal is provided. The gesture input method includes acquiring as an image a predetermined range that is photographed; analyzing the acquired image detecting a fingerprint of the user; storing a trajectory of motions of the finger when the detected fingerprint temporally changes according to an operation of the user's finger; and extracting a predetermined motion pattern, which is set in advance, from the stored trajectory and converting the motion pattern to an input signal that is associated with the motion pattern in advance.

According to further embodiment of the present invention, a gesture input apparatus program for executing a gesture input method on a gesture input apparatus for detecting a motion of a user's finger and converting the motion to an input signal is provided. The gesture input method includes acquiring as an image a predetermined range that is photographed; analyzing the acquired image detecting a fingerprint of the user; storing a trajectory of motions of the finger when the detected fingerprint temporally changes according to an operation of the user's finger; and extracting a predetermined motion pattern, which is set in advance, from the stored trajectory and converting the motion pattern to an input signal that is associated with the motion pattern in advance.

According to an embodiment of the present invention, a gesture input apparatus, a gesture input method, and a program for, when a fingerprint of a user is detected from a photographed image and its trajectory matches with a predefined operating pattern, converting the motion pattern to an input signal corresponding to the motion pattern can be provided.

BRIEF DESCRIPTION OF THE DRAWINGS

FIG. 9 shows a part of a fingerprint position table in a fingerprint position database 50 according to an embodiment of the present invention.

FIG. 10 shows a part of a motion pattern table in a motion pattern database 51 according to an embodiment of the present invention.

DETAILED DESCRIPTION

Figure 1:
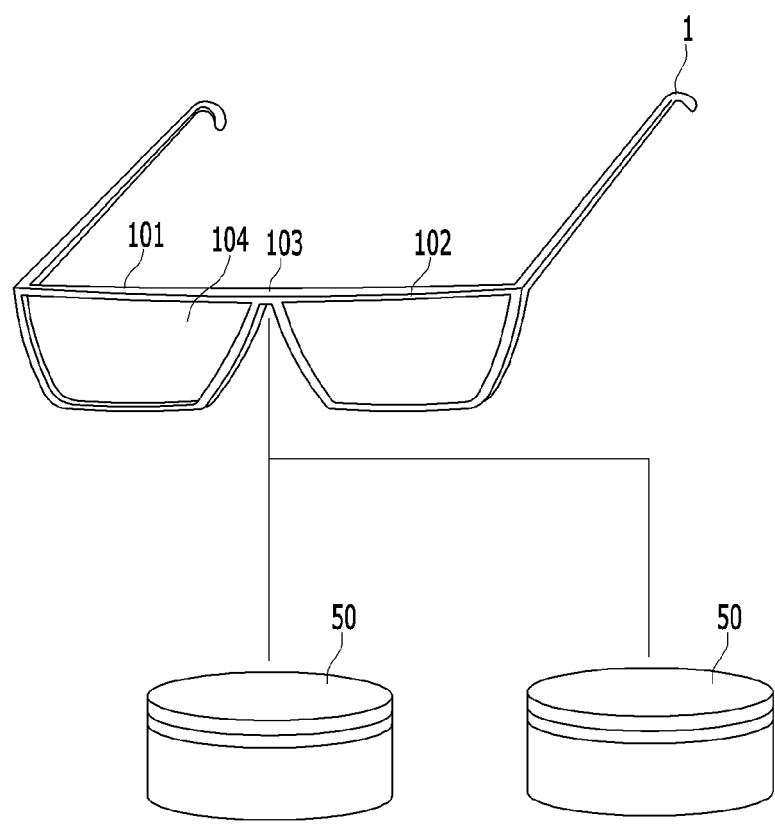
FIG. 1 is a schematic diagram for explaining an overview of a gesture input apparatus 1 according to an embodiment of the present invention.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

An overview of embodiments of the present invention is described. A gesture input apparatus 1 according to an embodiment of the present invention acquires images photographed by a camera 101 and a camera 102 when a user's finger draws a trajectory like arrows 202 and 203 by stroking, for example, reference numbers 201b and 201c from a reference number 201a, detects a user's fingerprint in the images, and stores the trajectory in a fingerprint position database 50. Thereafter, the gesture input apparatus 1 extracts from a motion pattern database 51 a motion pattern matching with the trajectory of the user's finger and extracts an input signal associated with the motion pattern. Then, the gesture input apparatus 1 converts the trajectory of the user's finger to the input signal such that the extracted input signal behaves in the same manner as being actually inputted.

Overview of Message Transmission System

Now, an overview of the gesture input apparatus 1 according to an embodiment of the present invention is described with reference to FIG. 1, FIG. 2, and FIG. 3. A gesture input apparatus 1 according to an embodiment of the present invention may be an information terminal. In one embodiment, the gesture input apparatus 1 may accept the converted input signal. In another embodiment, the gesture input apparatus 1 may have a communication function, operate as an input device, and transmit the converted input signal to another device to which the gesture input apparatus 1 is communicatively connected. A following embodiment describes the former embodiment.

FIG. 1 is a schematic diagram for explaining an overview of a gesture input apparatus 1 according to an embodiment of the present invention. Here, the gesture input apparatus 1 has a shape that imitates glasses and a person can use the gesture input apparatus 1 by mounting it on the face. In some embodiment, the gesture input apparatus 1 may be not the shape that imitates the glasses. For example, if the gesture input apparatus 1 may have a function to be described below, it may be a device or information terminal including a smartphone.

The gesture input apparatus 1 includes a camera 101 for photographing the same range as a field of view of a right eye and a camera 102 for photographing the same range as a field of view of a left eye. A controller 11 for controlling the gesture input apparatus 1, a storage unit 13 for storing information, and a communication unit 14 for communicating with other devices are housed in a housing unit 103 near a center. The controller 11, the storage unit 13, and the communication unit 14 are described in detail below.

The storage unit 13 includes a fingerprint position database 50 for storing a fingerprint position of the user and a motion pattern database 51 for converting a motion pattern to an input signal. Further, a feature amount of the fingerprint of the user is stored in the storage unit 13. The storage unit 13 may further include an input signal database 52 in which input signals corresponding to input signal IDs stored in the motion pattern database 51 are stored.

In one embodiment, a lens 104 may be merely a glass regardless of whether it is a prescription glass or a non-prescription glass. In another embodiment, the lens may be a display device such as a liquid crystal display or an organic light emitting display on which information is displayed with being superimposed on a field of view. In yet another embodiment, the gesture input apparatus 1 may include a projector for allowing the information to be displayed with being superimposed on the field of view by projecting the information to the lens 104. The motion of the information terminal after the gesture is converted into the input signal is not included in the scope of the present invention and is not described in detail here.

Figure 2:
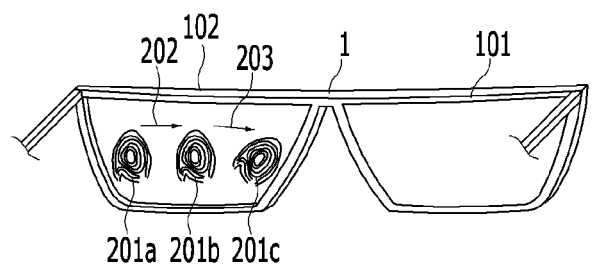
FIG. 2 is a diagram showing an example of a case that a gesture is converted to an input signal by using a gesture input apparatus 1 according to an embodiment of the present invention.

FIG. 2 is a diagram showing an example of a case that a gesture is converted to an input signal by using a gesture input apparatus 1 according to an embodiment of the present invention. An image front side is a front side for the user, and chord parts of glasses are partially not shown because of its length. A fingerprint 201a, a fingerprint 201b, and a fingerprint 201c are not displayed by the gesture input apparatus 1 but are traces of user's fingers which the user sees through the glasses. An arrow 202 and an arrow 203 are not actually visible but are only shown for a description.

When the user moves a finger of a left hand from the left to the right in front of a left eye, the finger traces the fingerprint 201a, the fingerprint 201b, and the fingerprint 201c with the passage of time. This state is photographed by a camera 102, and the user's fingerprint can move from the left to the right, that is, the trajectory of the user's finger can be captured. When the movement from the left to the right is associated with an input signal that is the same as a swipe from the left to the right on the touch panel, the user can photograph the trace of the finger by the camera 102 such that an event of performing the same motion as swiping the touch panel can be generated on the gesture input device 1.

Figure 3:
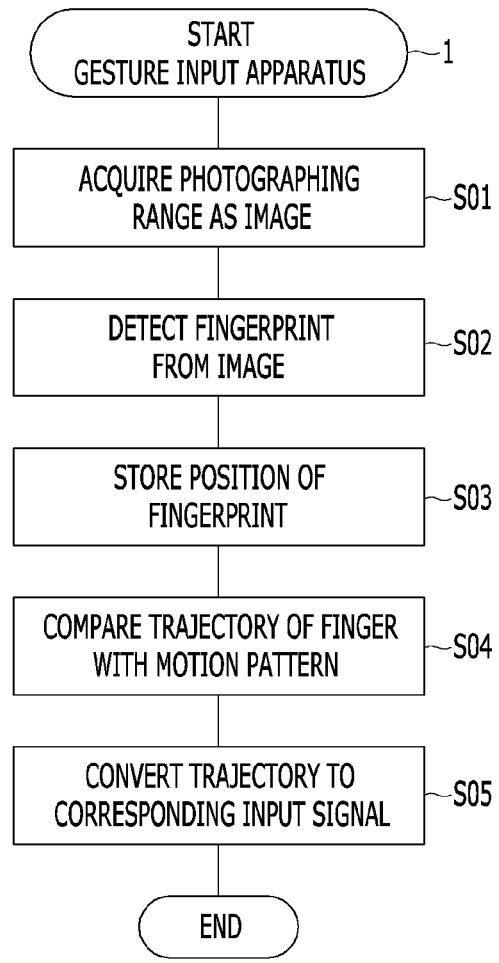
FIG. 3 is a flowchart showing a procedure of a gesture input process executed by a gesture input apparatus 1 according to an embodiment of the present invention.

FIG. 3 is a flowchart showing a procedure of a gesture input process executed by a gesture input apparatus 1 according to an embodiment of the present invention. The following describes a procedure of a gesture input processing.

First, the gesture input apparatus 1 acquires photographing ranges of a camera 101 and the camera 102 as images (Step S01). Here, the number of cameras may be at least one. However, as described later, an accuracy of accepting a three-dimensional gesture as an input may decrease in a case of only one camera.

Next, the gesture input apparatus 1 detects the user's fingerprint from the acquired images (Step S02). The gesture input apparatus 1 calculates a position of the fingerprint relative to the gesture input apparatus 1 from a position of the fingerprint within the image, and stores the calculated position in the fingerprint position database 50 (Step S03). The steps S01 to S03 are referred to as a fingerprint detecting and position storing process.

Then, the gesture input apparatus 1 reads from the fingerprint position database 50 positions of fingerprints which are stored for a predetermined time period from the current, regards the positions as a continuous trajectory, and extracts from a motion pattern database 51 a motion pattern matching with the trajectory (Step S04). Then, the gesture input apparatus 1 converts the trajectory to an input signal by assuming that the input signal corresponding to the matched motion pattern is inputted, and accepts the input signal or transmits the input signal to another device that is communicatively connected to the gesture input apparatus 1 (Step S05). The steps S04 and S05 are referred to as a trajectory to input signal converting process. The above is the procedure of the gesture input process executed by the gesture input apparatus 1.

As described above, the gesture input apparatus 1 can convert the user's gesture to the input signal by executing the above gesture input process. The above is the overview of the gesture input apparatus 1 according to a preferred embodiment of the present invention.

System Configuration of Gesture Input Apparatus 1

Figure 4:
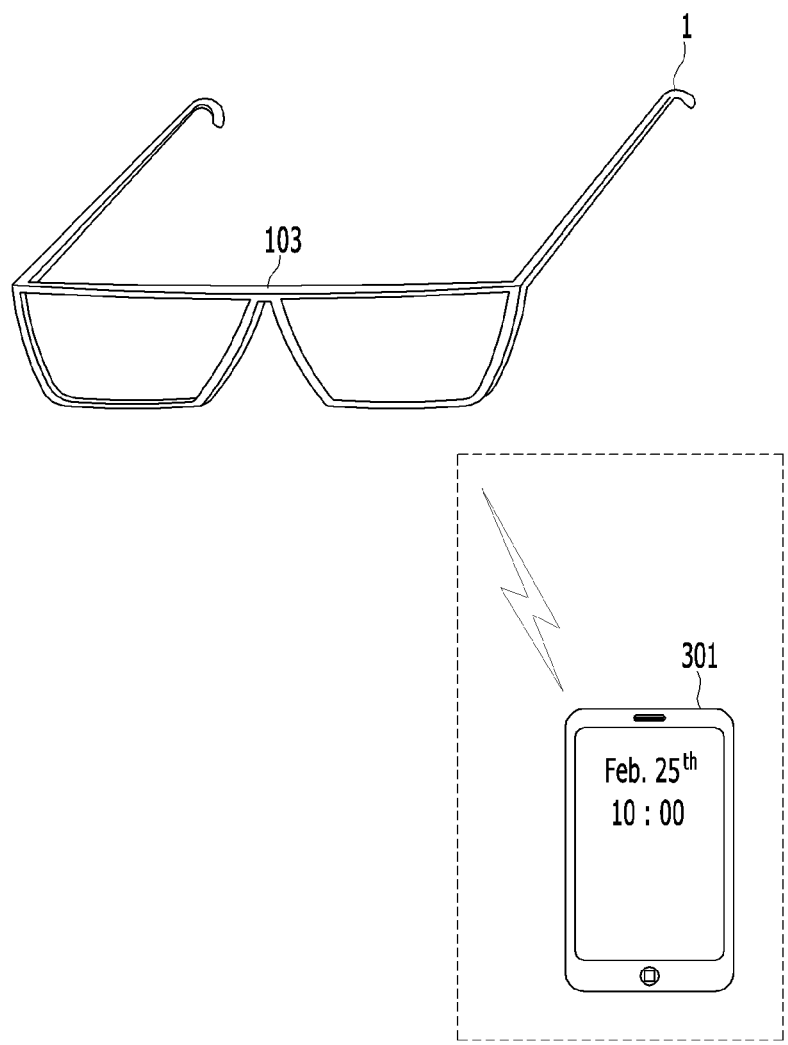
FIG. 4 is a schematic diagram showing a system configuration of a gesture input apparatus 1 according to an embodiment of the present invention.

FIG. 4 is a schematic diagram showing a system configuration of a gesture input apparatus 1. The gesture input apparatus 1 is an information terminal. In a case of the configuration where the gesture input apparatus 1 itself accepts the converted input signal, a portion indicated by a dotted line in FIG. 4 is not present and the process is executed only by the gesture input apparatus 1.

On the other hand, in a case that the gesture input apparatus 1 acts as a simple input device, the gesture input apparatus 1 may have a communication function, be connected to the portion indicated by the dotted line in FIG. 4, i.e. be communicably connected to an information terminal 301, and transmit the converted input signal to the information terminal 301. A communication between the gesture input apparatus 1 and the information terminal 301 may be performed by a wireless connection such as WiFi (Wireless Fidelity) conforming to the IEEE standard 802.11 or Bluetooth, or may be performed by a wired connection. The information terminal 301 receives the input signal from the gesture input apparatus 1 and acts as if an input unit of the information terminal 301 accepts an input.

Description of Each Function

Figure 5:
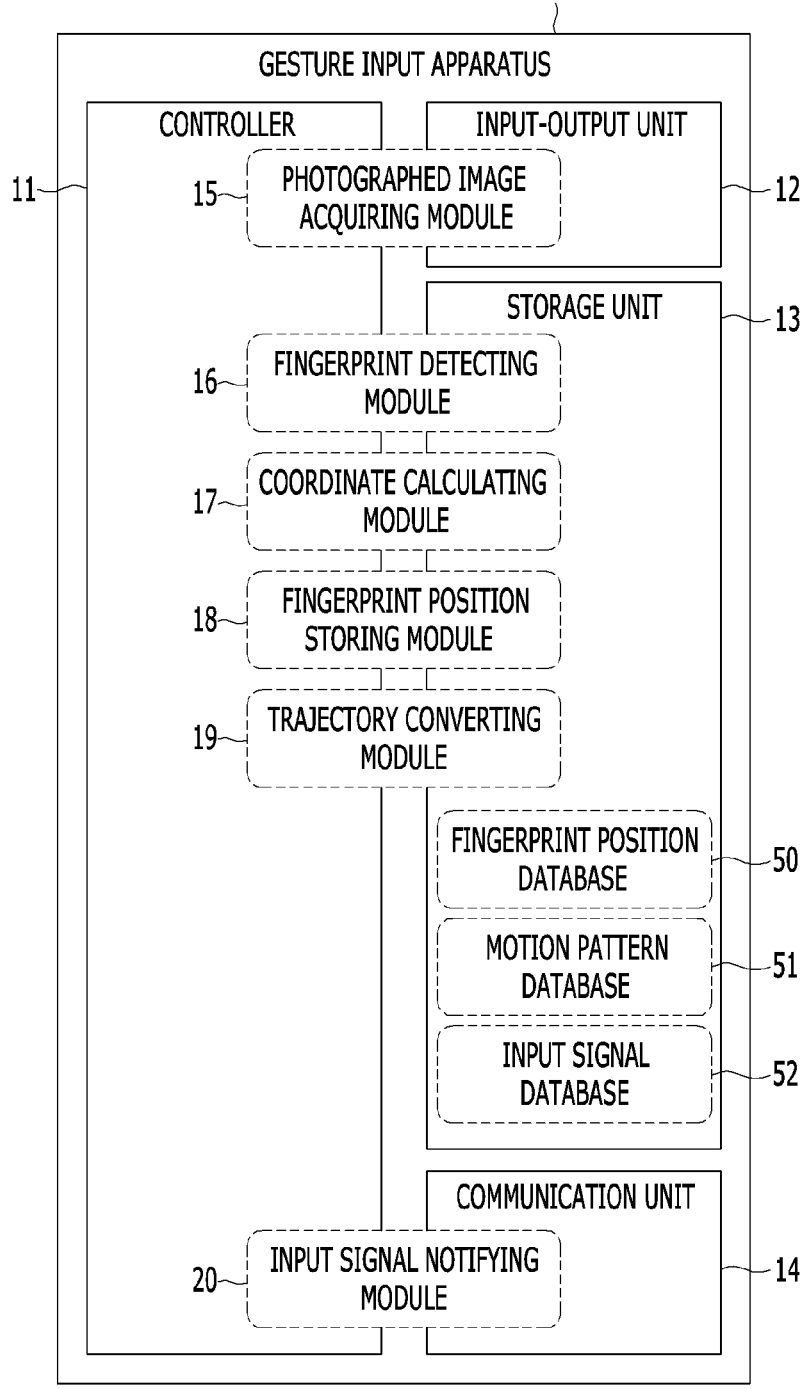
FIG. 5 is a functional block diagram of a gesture input apparatus 1 according to an embodiment of the present invention.

A configuration of a gesture input apparatus 1 is described with reference to FIG. 5. FIG. 5 is a functional block diagram of a gesture input apparatus 1 according to an embodiment of the present invention. As shown in FIG. 5, the gesture input apparatus 1 according to an embodiment of the present invention includes, as a controller 11, a central processing unit (CPU), a random access memory (RAM), a read only memory (ROM) or the like. The gesture input apparatus 1 includes, as an input-output unit 12, a photographing device such as a camera or the like for photographing a predetermined range as an image and further includes a display unit such as a liquid crystal display or a projection screen for displaying an image or a text message. Further, the gesture input apparatus 1 includes, as a storage unit 13 for storing data and files, a storage section of data such as a hard disk, a semiconductor memory, a recording medium, a memory card, or the like. The storage unit 13 includes a fingerprint position database 50, a motion pattern database 51, and an input signal database 52. Additionally, for functioning as an input device of another device, the gesture input apparatus 1, as a communication unit 14, includes a device for enabling communication with another device, for example, a WiFi enabled device conforming to the IEEE standard 802.11

In the gesture input apparatus 1, the controller 11 reads a predetermined program, thereby realizing a photographed image acquiring module 15 in cooperating with the input unit 12. Further, in the gesture input apparatus 1, the controller 11 reads a predetermined program, thereby realizing a fingerprint detecting module 16, a coordinate calculating module 17, a fingerprint position storing module 18, and a trajectory converting module 19 in cooperating with the storage unit 13. Further, in the gesture input apparatus 1, the controller 11 reads a predetermined program, thereby realizing an input signal notifying module 20 in cooperating with the communication unit 14.

Storage Process of Detection and Position of Fingerprint

Figure 6:
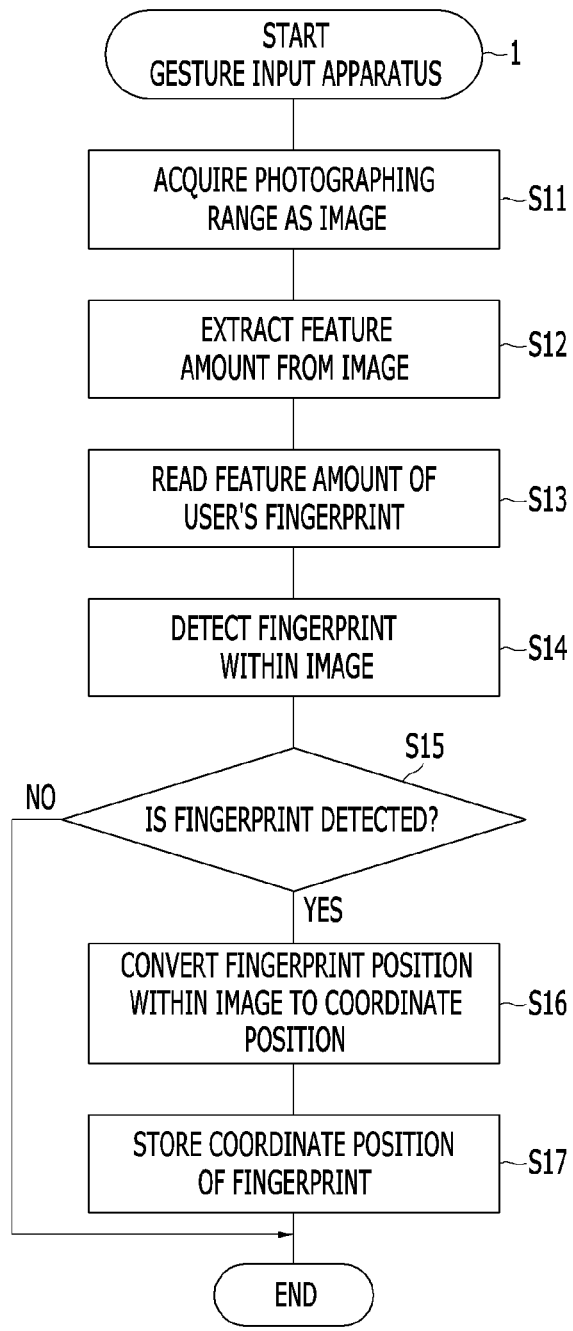
FIG. 6 is a flowchart showing a procedure of a fingerprint detecting and position storing process executed by a gesture input apparatus 1 according to an embodiment of the present invention.

FIG. 6 is a flowchart showing a procedure of a fingerprint detecting and position storing process executed by a gesture input apparatus 1 according to an embodiment of the present invention. The fingerprint detecting and position storing process is described.

First, a photographed image acquiring module 15 of a gesture input apparatus 1 includes obtains photographing ranges of a camera 101 and a camera 102 as images (Step S11). In a case of an apparatus imitating glasses as in the present embodiment, the photographing ranges of the two cameras are approximately matches the user's field of view.

A fingerprint detecting module 16 of the gesture input apparatus 1 extracts a feature amount for each of the images in order to detect the user's fingerprint included in the acquired images (Step S12). In some embodiments, the feature amount is a value used as a comparison when performing pattern recognition that recognizes as a pattern the user's fingerprint previously stored from the received images. More specifically, the fingerprint detecting module 16 may equally divide the acquired image into vertically a predetermined number and horizontally a predetermined number, and calculate an average value of colors of pixels in each portion.

Next, the fingerprint detecting module 16 reads the feature amount of the user's fingerprint stored in the storage unit 13 that is provided with the gesture input device 1 (Step 13). In one embodiment, a feature amount of a common fingerprint may be read instead of the fingerprint of the particular user. In this case, if the read one is a fingerprint regardless of a person and a finger, the fingerprint may be converted into an input signal. In another embodiment, when reading the feature amount of the fingerprint of the particular user, it may serve as a user authentication function for a security. In yet another embodiment, the feature amount of the fingerprint of each of a plurality of fingers may be read. In this case, a process described below may be executed for each of the fingers such that a combination of gestures of the fingers can be converted to the input signal.

The fingerprint detecting module 16 uses the feature amount of the read fingerprint to detect a fingerprint from the acquired images (Step S14). That is, the fingerprint portion may be detected in the image, by performing the pattern recognition on the feature amount of the fingerprint from the feature amount of the images. In this case, when the finger is inclined with respect to the camera, the fingerprint may be represented as the projection within the image such that the detection cannot be successfully performed. Regarding this problem, it is possible to improve the detection accuracy of the fingerprint by three-dimensionally capturing an object in the image by comprehensively considering the feature amount at each camera.

As a result of step S14, if the fingerprint is detected from the image (Step S15: YES), the following process is performed continuously. If the fingerprint is not detected from the image (Step S15: NO), the following process is not performed and the fingerprint detecting and position storing process ends.

If the fingerprint is detected by the fingerprint detecting module 16, regardless of the size of the finger, a straight line connecting the fingerprint and the camera can be expressed as an equation from the position of the fingerprint in the image. In some embodiment, if the number of cameras is two or more, a coordinate calculating module 17 may solve linear equations for the respective camera as simultaneous equations to calculate the position of the fingerprint in a three-dimensional coordinate system centered on the gesture input apparatus 1 (Step S16). In the calculation of the solution, a calculation algorithm stored in the storage unit 13 may be read and used. In some embodiments, the coordinate calculating module 17 may obtain the positions of the two or more points of the fingerprint to calculate a direction of the finger. In one embodiment, the position of the fingerprint may be a position of a predetermined point in the fingerprint.

In some embodiment, then the number of cameras is one, it is noted that the above scheme may not be used since only one equation can be obtained. Therefore, the coordinate calculating module 17 may calculate a distance between the camera and the finger on the basis of a size of the finger that is previously stored, and calculate the direction by distortion of the fingerprint within the image or calculate the position of the finger in a two-dimensional coordinate system instead of the three-dimensional coordinate system.

Figure 8:
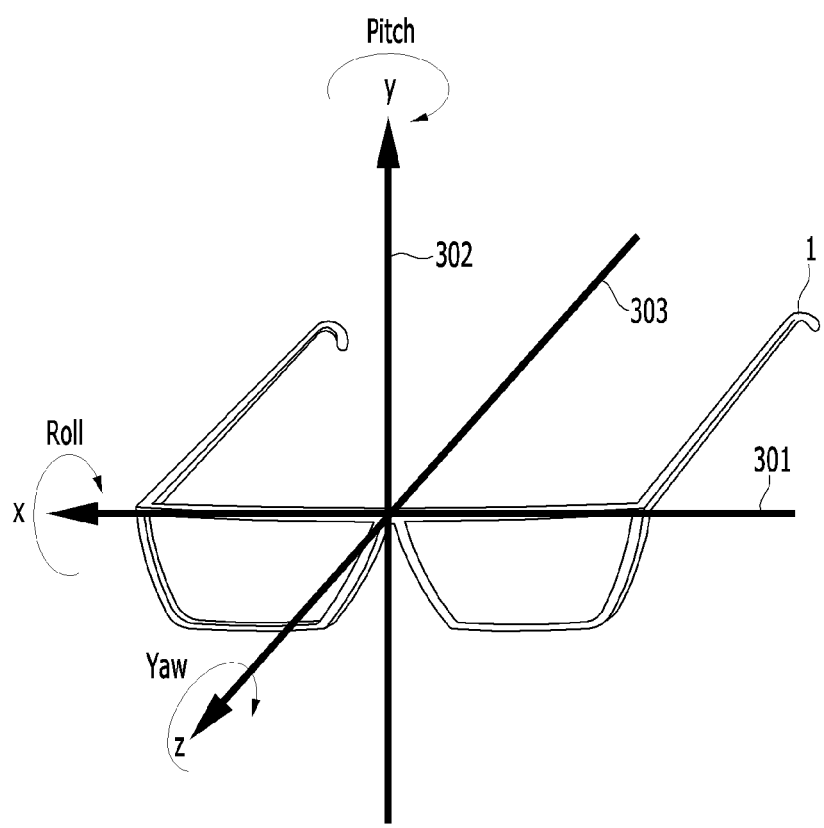
FIG. 8 is a diagram showing a three-dimensional coordinate system with a gesture input apparatus 1 as an origin.

FIG. 8 is a diagram showing a three-dimensional coordinate system with a gesture input apparatus 1 as an origin. When wearing the gesture input apparatus 1, a right hand direction of the user is a positive direction of an x-axis. Further, an overhead direction of the user is a positive direction of a y-axis and its vertical direction is a negative direction. Further, when capturing the position of the finger in three-dimensional coordinate system, a front direction of the user is a positive direction of a z-axis. In addition, rotation angles with respect to the x-axis, y-axis, and z-axis are represented by Roll, Pitch, and Yaw, respectively. In the present embodiment, a right-hand screw direction with respect to an axis is a positive direction and is represented in the range of from −180 degrees to +180 degrees. By using Roll, Pitch, and Yaw, an orientation from a base direction of the finger to a fingertip direction can be numerically described such that a more complex gesture can be expressed. Although an orthogonal coordinate system is adopted in the present embodiment, a polar coordinate system may be used and a scheme for representing the position and orientation of the finger is not limited thereto.

Thereafter, a fingerprint position storing module 18 of the gesture input apparatus 1 stores in the fingerprint position database 50 the calculated x, y, z, Roll, Pitch, and Yaw together with the date and time of the acquired images (Step S17). FIG. 9 shows a part of a fingerprint position table of the fingerprint position database 50 according to an embodiment of the present invention.

The above is the procedure of the fingerprint detecting and position storing process executed by the gesture input apparatus 1.

Input Signal Conversion Process of Trajectory

Figure 7:
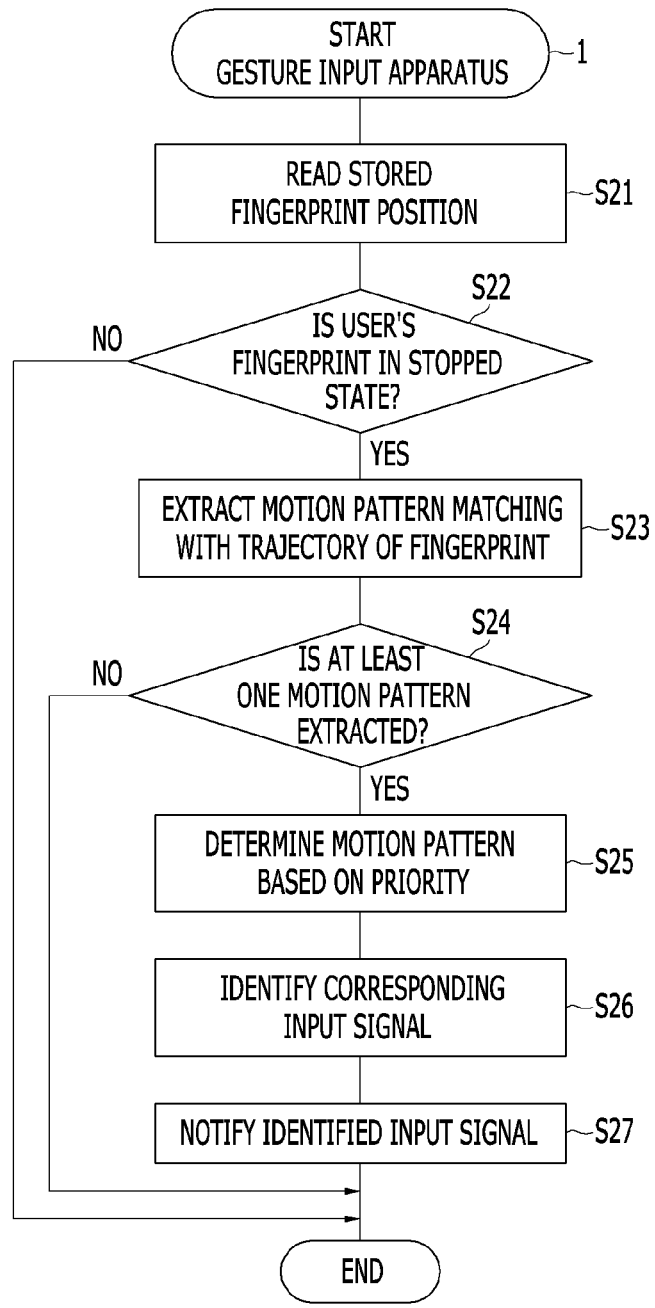
FIG. 7 is a flowchart showing a procedure of a trajectory to input signal converting process executed by a gesture input apparatus 1 according to an embodiment of the present invention.

FIG. 7 is a flowchart showing a procedure of a trajectory to input signal converting process executed by a gesture input apparatus 1 according to an embodiment of the present invention. The trajectory to input signal converting process is described below.

First, a trajectory converting module 19 of the gesture input apparatus 1 reads a position of the stored fingerprint from a fingerprint position database 50 (Step S21). In some embodiments, since an input is usually done in a few seconds, only the position of the fingerprint from the current up to a few seconds before may be read.

Here, the trajectory converting module 19 determines whether the user's finger is in a stopped state by, in a predetermined period, determining whether a change in each coordinate component of the fingerprint is equal to or less than a predetermined frequency value or determining whether there is no fingerprint in an image. If the user's finger is not the stopped state (Step S22: NO), the user's finger is determined as a state where the user's finger is drawing the trajectory. Accordingly, the following process is not performed, and the trajectory to input signal converting process is terminated. If the user's finger is in the stopped state (Step S22: YES), the following process continuously executed in order to convert the trajectory to the input signal. A fact that there is no fingerprint in the image at a certain time may be determined as a fact that the fingerprint position database 50 does not include a record of the corresponding time.

A trajectory converting module 19 regards the positions of the read fingerprint as a consecutive trajectory and extracts a motion pattern matching with the trajectory from the motion pattern database 51 (Step S23). If the motion pattern is not extracted (Step S24: NO), it is determined that that the user has not made a valid input. Accordingly, the following process is not executed, and the trajectory to input signal converting process ends. If one or more motion patterns are extracted (Step S24: YES), the following process is continuously executed.

FIG. 10 shows a part of a motion pattern table in a motion pattern database 51 according to an embodiment of the present invention. In the present embodiment, the motion pattern is represented by a combination of respective steps in a motion corresponding to the x-axis, y-axis, and z-axis. Each motion pattern is associated with the input signal. There is no limitation that one motion pattern is not associated with two or more input signals.

For example, when an x coordinate of the fingerprint is increased by elapsed time, it is assumed that a motion of the "RIGHT" in a corresponding step is acted. When a y-coordinate is increased thereafter, it is assumed that a motion of the "UP" is acted. In such a case, a pattern with a pattern ID of 2 is matched. For each variation, a threshold may be set.

In FIG. 10, a case that two or more motions are required in each step is represented by connecting a comma. For example, in a case of "RIGHT, UP," x and y coordinates are increased at the same timing and are first filled. When there is no condition in each step, it is represented by a character string of "NULL."

In some embodiments, in an extraction scheme, a case of extracting a pattern satisfying at least a condition rather than extracting the motion pattern with which the motions of all the steps perfectly match may be convenient. For example, when a pattern where the step 1 is "RIGHT" and the step 2 is "UP, LEFT" is not included in the motion pattern table, it is desirable to determine that a motion pattern of pattern ID 2 or a motion pattern of pattern ID 3 is erroneously inputted when the fingerprint moves and regards an input as any one of the motion pattern of pattern ID 2 or the motion pattern of pattern ID 3.

In such a case, the trajectory converting module 19 may first extract the pattern satisfying at least the condition. When a plurality of motion patterns are extracted, the trajectory converting module 19 may determine the motion pattern having the highest priority among the plurality of motion patterns as the matching motion pattern (Step S25). The priority may be higher as the more complex the motions are or the lower a risk of the user when the motions are erroneously inputted is. In the former example, if a motion matches with both the motion patterns with pattern IDs 3 and 11, pattern ID 11 that is the more complex has a higher priority. In the latter example, a motion pattern associated with a cancel button has a higher priority than a motion pattern associated with a power button or an enter key.

Next, the trajectory converting module 19 identifies an input signal associated with the determined motion pattern (Step S26). In the motion pattern database 51, the corresponding input signal ID may be stored as in the present embodiment, or an instruction to be executed on a device may be stored in binary format. If the ID format is stored, the trajectory converting module 19 refers to an input signal database 52 in the storage unit 13 and converts the input signal ID to an actual input signal. One represented by the input signal may be a mouse movement or a depression of a particular key, or may be an input signal corresponding to the pinch or swipe on the touch panel. Further, the input signal may be represented by a function that takes a change in each coordinate component of the fingerprint in a variable.

Finally, an input signal notifying module 20 of the gesture input apparatus 1 notifies a target of the input signal identified by the trajectory to input signal converting module 19 (Step S27). When the target of the notification is the gesture input apparatus 1 itself, as an example, sending a message to an operating system of the gesture input apparatus 1 can make the operating system act as if an input unit accepts the same input. In this case, it is not necessary to operate the communication unit 14. When the gesture input apparatus 1 acts as an input device of another information terminal, the gesture input apparatus 1 transmits an input signal specific to the information terminal.

The above is the procedure of the trajectory to input signal converting process executed by the gesture input apparatus 1.

In the above description, the positions of the read fingerprint are regarded as the continuous trajectory and a motion pattern matching with the trajectory is extracted from the motion pattern database 51. However, without authenticating the exact fingerprint as a key, an image of the finger may be stored in advance and the motion pattern may be extracted by the image recognition using the same. An image authentication such as a specific color, mole, or scar of the finger or a shape of the finger may be used. Further, the motion pattern may be extracted by recognizing a temperature of the finger by using a temperature authentication.

The above-described means and functions may be realized by reading and executing a predetermined program by a computer (including a CPU, an information processing apparatus, and various terminals). The program may be recorded in a computer-readable recording medium, for example, a flexible disk, a CD (e.g., a CD-ROM or the like) and a DVD (e.g., a DVD-ROM, a DVD-RAM, or the like). In this case, the program may be read from the recording medium by the computer and be transmitted to an internal storage unit or an external storage unit to be stored and executed. Further, the program may be pre-stored in a storage unit (recording medium) such as a magnetic disk, an optical disk, or an optical magnetic disk and be transmitted from the recording medium to the computer through a communications line.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims

DESCRIPTION OF REFERENCE NUMBERS

1: Message transmission system, 50: fingerprint position database, 51: motion pattern database

What is claimed is:

1. A gesture input apparatus for detecting a motion of a user's finger and converting the motion to an input signal, the gesture input apparatus comprising:
   a photographing means configured to acquire as an image a predetermined range that is photographed;
   a fingerprint detecting means configured to analyze the image acquired by the photographing means and to detect a fingerprint of the user;
   a fingerprint motion storing means configured to store a trajectory of motions of the finger when the fingerprint detected by the fingerprint detecting means temporally changes according to an operation of the user's finger; and an input signal converting means configured to extract a predetermined motion pattern, which is set in advance, from the trajectory stored by the fingerprint motion storage unit and to convert the motion pattern to an input signal that is associated with the motion pattern in advance, wherein the photographing means three-dimensionally photographs the predetermined range not two-dimensionally, and wherein the fingerprint motion storing means three-dimensionally stores the motions of the finger.

2. The gesture input apparatus of claim 1, further comprising a fingerprint identifying means configured to identify whether the fingerprint detected by the fingerprint detecting means matches with a fingerprint registered in advance.

3. A gesture input method of detecting a motion of a user's finger and converting the motion to an input signal, the gesture input method comprising:

acquiring as an image a predetermined range that is photographed;

analyzing the acquired image to detect a fingerprint of the user;

storing a trajectory of motions of the finger when the detected fingerprint temporally changes according to an operation of the user's finger; and extracting a predetermined motion pattern, which is set in advance, from the stored trajectory and converting the motion pattern to an input signal that is associated with the motion pattern in advance, wherein acquiring the predetermined range includes three-dimensionally photographing the predetermined range not two-dimensionally, and wherein storing the trajectory includes three-dimensionally storing the motions of the finger.

4. The gesture input method of claim 3, further comprising identifying whether the fingerprint detected by the fingerprint detecting means matches with a fingerprint registered in advance.

5. A non-transitory computer-readable recording medium that store a program for executing a gesture input method on a gesture input apparatus for detecting a motion of a user's finger and converting the motion to an input signal, the gesture input method comprising:

acquiring as an image a predetermined range that is photographed;

analyzing the acquired image to detect a fingerprint of the user;

storing a trajectory of motions of the finger when the detected fingerprint temporally changes according to an operation of the user's finger; and extracting a predetermined motion pattern, which is set in advance, from the stored trajectory and converting the motion pattern to an input signal that is associated with the motion pattern in advance, wherein acquiring the predetermined range includes three-dimensionally photographing the predetermined range not two-dimensionally, and wherein storing the trajectory includes three-dimensionally storing the motions of the finger.

6. The non-transitory computer-readable recording medium of claim 5, wherein the gesture input method further comprises identifying whether the fingerprint detected by the fingerprint detecting means matches with a fingerprint registered in advance.

* * * * *